(12) United States Patent
Shirakawa

(10) Patent No.: US 7,038,148 B2
(45) Date of Patent: May 2, 2006

(54) OPERATING DEVICE OF ELECTRONIC APPARATUS

(75) Inventor: Mikio Shirakawa, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/990,029

(22) Filed: Nov. 16, 2004

(65) Prior Publication Data

US 2005/0110347 A1 May 26, 2005

(30) Foreign Application Priority Data

Nov. 26, 2003 (JP) .............................. 2003-394875

(51) Int. Cl.
*H01H 9/28* (2006.01)
(52) U.S. Cl. .................... 200/43.11; 200/321; 200/564
(58) Field of Classification Search .. 200/43.11–43.16, 200/321, 327, 564, 570
See application file for complete search history.

(56) References Cited

U.S. PATENT DOCUMENTS

| | | | |
|---|---|---|---|
| 5,998,743 A | 12/1999 | Unkel | |
| 6,386,169 B1 * | 5/2002 | Gracyalny et al. | 123/185.14 |
| 6,404,354 B1 * | 6/2002 | Decker et al. | 341/35 |
| 6,787,721 B1 * | 9/2004 | Huang | 200/334 |
| 6,909,061 B1 * | 6/2005 | Jong | 200/334 |

\* cited by examiner

*Primary Examiner*—K. Lee
(74) *Attorney, Agent, or Firm*—Brinks Hofer Gilson & Lione

(57) ABSTRACT

An operating device of an electronic apparatus contains a rotatable operating knob protruding from a panel and stopper means for preventing the rotation of the operating knob. When the power of the electronic apparatus is turned off, the rotation of the operating knob is prevented by a stopper part of the stopper means. When the power of the electronic apparatus is turned on, the rotational operation of the operating knob is can be performed by releasing the stopper part of the stopper means. Therefore, when the power of the electronic apparatus is turned off, that is, when the adjustment of the electronic apparatus is not needed, even when a user inadvertently touches the operating knob, the operating knob does not rotate. Thus, a previously set value is prevented from being inadvertently changed.

13 Claims, 2 Drawing Sheets

OPERATING DEVICE OF ELECTRONIC APPARATUS

This application claims the benefit of priority to Japanese Patent Application No. 2003-394875 filed on Nov. 26, 2003, herein incorporated by reference.

BACKGROUND OF THE INVENTION

1. Field of the Invention

The present invention relates to an operating device of an electronic apparatus, which is suitably used in a audio device or an air conditioner mounted on a vehicle.

2. Description of the Related Art

FIG. 4 is an explanatory view illustrating a schematic construction of a conventional operating device of the electronic apparatus. The construction of the conventional electronic apparatus will now be described with reference to FIG. 4. An operating device 52 of an electronic apparatus 51 such as a audio device and an air conditioner mounted on a vehicle comprises a printed circuit board 53, and a switch 54 attached to the printed circuit board 53.

The operating device 52 further comprises a rotary variable resistor 55, an operating shaft 56, and an operating knob 58. The operating shaft is arranged so that it is rotatable and movable in up and down directions. The operating knob is attached to the operating shaft 56 to be pushed-in and retreated corresponding to the inserted and projected operations with respect to a panel of the device, and is rotatably operated.

Further, the operating knob 58 can be manually operated, and at the time of projecting operation from the panel 57, the blast volume adjustment of the air conditioner or the sound volume adjustment of the audio device is performed by manually rotating the operating knob 58.

Further, when the operating knob 58 is manually pushed-in toward the device, the operating knob 58 comes to be maintained in its inserted operation state. And, the operating shaft 56 is moved by the operating knob 58 to operate the switch 54, and a manual mode is switched to an automatic mode.

In this manner, when the operating knob 58 is in its inserted operation state, the operating knob 58 is prevented from being inadvertently touched by a user. Thus, a previously set value is prevented from being changed.

Further, when the operating knob 58 is pushed while in its inserted operation state, the operating knob 58 retreats from the device and comes to be in its projected operation state. That is, the operating knob 58 is in its manually rotatable state.

Further, by a 'push-push mechanism', the operating knob 58 is pushed-in and maintained in its inserted operation state and is again pushed to be retreated from its inserted operation state to be in its projected operation state (for example, see Japanese Unexamined Patent Application Publication No. 10-53018).

However, in the conventional operating device of such an electronic apparatus, when the power of the electronic apparatus is turned off with the operating knob being in its projected operation state, the operating knob 58 is still rotatable in its projected operation state. Therefore, when a user inadvertently touches the operating knob 58, the previously set value may also be inadvertently changed.

Specifically, in the case in which the power of the electronic apparatus 51 is turned off, that is, in a state in which a new setting is not needed, the previously set value may be changed.

In the conventional operating device of the electronic apparatus mentioned above, there is a problem in that, even when the power of the electronic apparatus 51 is turned off with the operating knob 58 being in its projected operation state, the operating knob 58 is still rotatable in its projected operation state, such that when a user inadvertently touches the operating knob 58, the previously set value may be changed.

SUMMARY OF THE INVENTION

An object of the invention is to provide an operating device of an electronic apparatus in which, when the power of the electronic apparatus is turned off, that is, when the adjustment of the electronic apparatus is not needed, the rotation of an operating knob is prevented so as not to change a previously set value.

According to a first aspect of the invention, an operating device of an electronic apparatus comprises a rotatable operating knob protruding from a panel and stopper means for preventing the rotational rotation of the operating knob. When the power of the electronic apparatus is turned off, the rotational rotation of the operating knob is prevented by a stopper part of the stopper means. When the power of the electronic apparatus is turned on, the rotational operation of the operating knob can be performed by releasing the stopper part of the stopper means.

Further, according to a second aspect of the invention, the power of the electronic apparatus is at least turned off by the operation of an engine key of a vehicle.

Further, according to a third aspect of the invention, the power of the electronic apparatus is turned on by the operation of the engine key of the vehicle, such that the rotational operation of the operating knob can be performed.

Further, according to a fourth aspect of the invention, the operating device of an electronic apparatus further comprises a switch unit which is manually operable for turning on or off the power of the electronic apparatus. When the power of the electronic apparatus is turned on by an operation of the switch unit, the operating knob can rotate by releasing the stopper part of the stopper means. And, when the power of the electronic apparatus is turned off by the operation of the switch unit, the rotational operation of the operating knob is prevented by the stopper part of the stopper means.

Further, according to a fifth aspect of the invention, when the power of the electronic apparatus can be turned on by the operation of the engine key or by the operation of the switch unit, turning on/off of the power of the electronic apparatus can be performed by the switch unit. And, when the power of the electronic apparatus is switched from ON state to OFF state by the operation of the engine key, the rotational operation of the operating knob is prevented by the stopper part of the stopper means.

Further, according to a sixth aspect of the invention, the stopper has a solenoid.

Further, according to a seventh aspect of the invention, the operating device of an electronic apparatus has a plurality of operating knobs and a plurality of stopper means, and the stopper means are arranged correspondingly to the respective operating knobs.

Further, according to an eighth aspect of the invention, the operating knob is attached to a rotatable member of a rotary electrical component, and the stopper means are arranged correspondingly to the operating knob or the rotatable member.

An operating device of the electronic apparatus according to the present invention comprises a rotatable operating knob protruding from a panel, and stopper means for preventing the rotational operation of the operating knob. When the power of the electronic apparatus is turned off, the rotational operation of the operating knob is prevented by a stopper part of the stopper means. And, when the power of the electronic apparatus is turned on, the rotational operation of the operating knob can be performed by releasing the stopper part of the stopper means.

In such a construction, when the power of the electronic apparatus is turned off, the rotational operation of the operating knob is prevented by the stopper part of the stopper means. Therefore, when the power of the electronic apparatus is turned off, that is, when the adjustment of the electronic apparatus is not needed, even when a user inadvertently touches the operating knob, the operating knob does not rotate. Accordingly, a previously set value is prevented from being inadvertently changed.

Further, the power of the electronic apparatus is at least turned off by the operation of an engine key of a vehicle. Thus, when the power of the electronic apparatus is turned off by the OFF operation of the engine key, the rotation of the operating knob can be prevented by the stopper means. Accordingly, the rotation of the operating knob is automatically prevented, and the rotation preventing operation is reliably performed.

Further, when the power of the electronic apparatus is turned on by the operation of the engine key of the vehicle, the rotational operation of the operating knob is allowed. Thus, when the power of the electronic apparatus is turned on by the ON operation of the engine key, the rotational of the operating knob can be allowed. Accordingly, the state of operating knob is automatically changed into the rotatable state and this rotation allowing operation is reliably performed.

The operating device of an electronic apparatus further comprises a switch unit which is manually operable for turning on or off the power of the electronic apparatus. When the power of the electronic apparatus is turned on by an operation of the switch unit, the operating knob can rotate by releasing the stopper part of the stopper means. And, when the power of the electronic apparatus is turned off by the operation of the switch unit, the rotational operation of the operating knob is prevented by the stopper part of the stopper means.

In such a construction, since the switch unit which is manually operable is provided, the diversification of operation can be contrived, and the operability can be improved. Further, since the rotatable state or non-rotatable state of the operating knob is changed by the operation of the stopper means corresponding to the operation of the switch unit, the switching of rotatable state and non-rotatable state of the operating knob can be automatically performed. Thus, the operability can be improved.

Further, when the power of the electronic apparatus can be turned on by the operation of the engine key or by the operation of the switch unit, turning on/off of the power of the electronic apparatus can be performed by the switch unit. And, when the power of the electronic apparatus is switched from ON state to OFF state by the operation of the engine key, the rotational operation of the operating knob is prevented by the stopper part of the stopper means. Therefore, the operation of the operating knob can be performed mainly on the basis of the engine key. Accordingly, when the power is turned on by the switch unit, even if the power is turned off by the OFF operation of the engine key, the operating knob is in its non-rotatable state, and the operation of the operating knob is reliably performed.

Further, the stopper means has a solenoid. Therefore, it is possible to provide an operating device which has a simple structure, is made at a low cost, and has enhanced productivity.

The operating device has a plurality of the operating knobs and a plurality of the stopper means, and the stopper means are arranged correspondingly to the respective operating knobs. Therefore, the operability of each operating knob is improved.

The operating knob is attached to a rotatable member of a rotary electrical component, and the stopper means are arranged correspondingly to the operating knob or the rotatable member. Therefore, it is possible to provide an operating device which has a simple structure, is made at a low cost, and has enhanced productivity.

DESCRIPTION OF THE PREFERRED EMBODIMENTS

Figure 1:
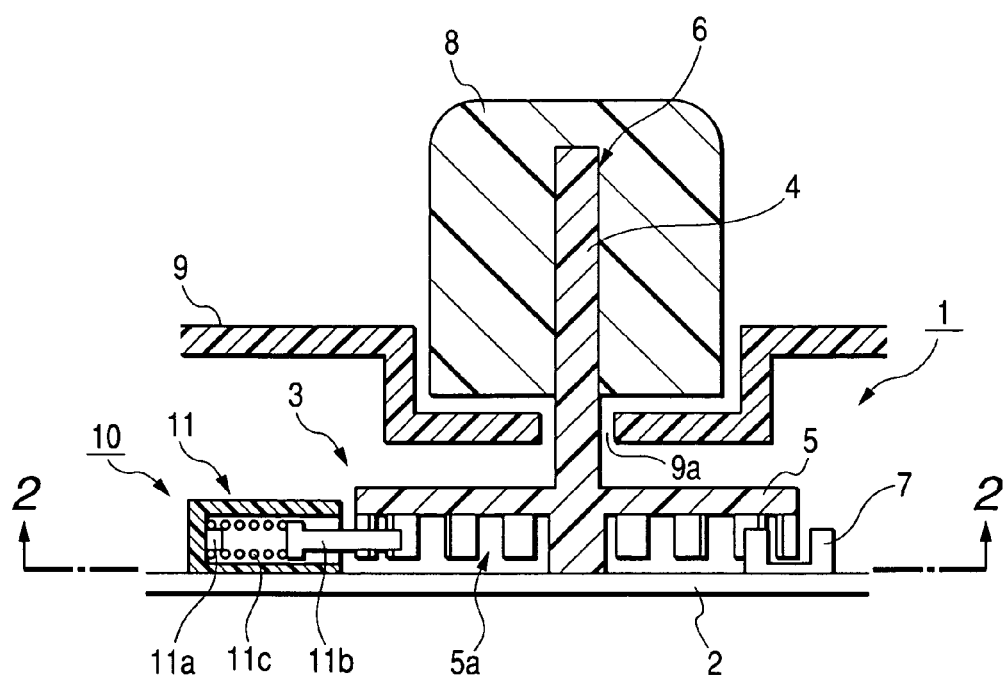
FIG. 1 is a sectional view illustrating the principal parts of an operating device of an electronic apparatus according to a first embodiment of the present invention.
Figure 2:
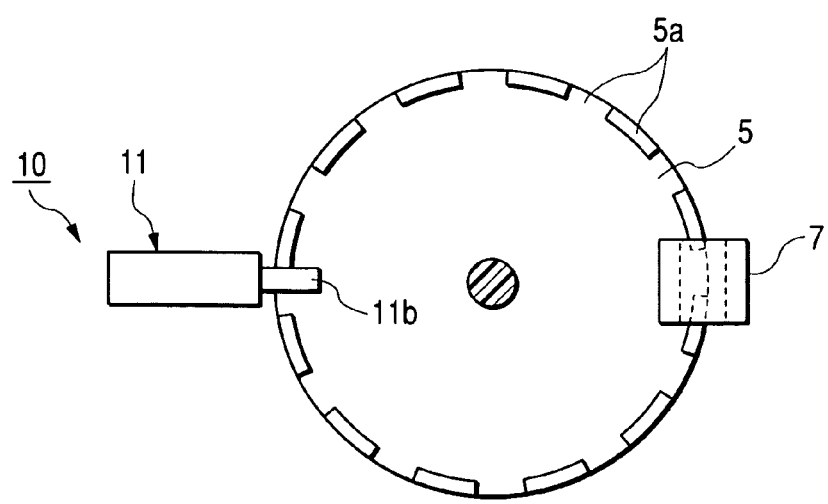
FIG. 2 is a sectional view taken along a line 2—2 in FIG. 1.
Figure 3:
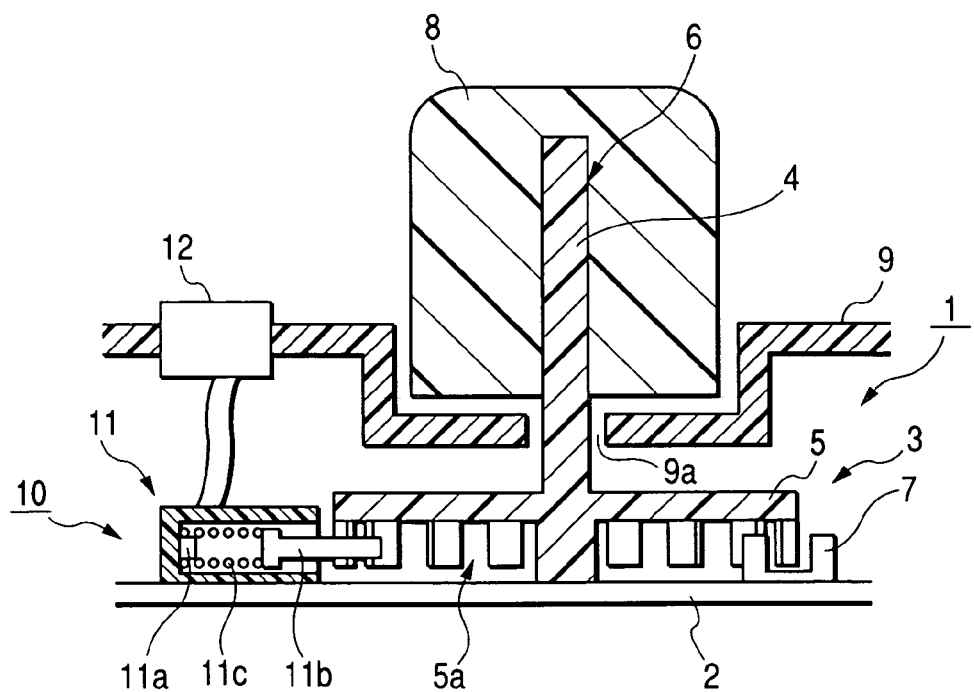
FIG. 3 is a sectional view illustrating the principal parts of an operating device of an electronic apparatus according to a second embodiment of the present invention.
Figure 4:
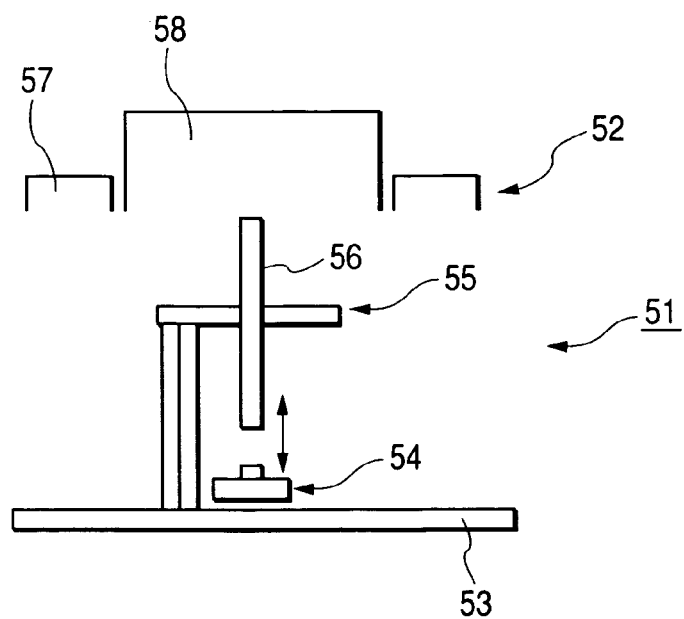
FIG. 4 is an explanatory view showing a schematic construction of an operating device of a conventional electronic apparatus.

Hereinafter, an operating device of an electronic apparatus according to the present invention will now be described with reference to the accompanying drawings. FIG. 1 is a sectional view illustrating principal parts of an operating device of an electronic apparatus according to a first embodiment of the present invention. FIG. 2 is a sectional view taken along a line 2—2 in FIG. 1. FIG. 3 is a sectional view illustrating the principal parts of an operating device of an electronic apparatus according to a second embodiment of the present invention.

Next, a first embodiment of the operating device of an electronic apparatus according to the present invention will now be described with reference to FIGS. 1 and 2. An operating device 1 of an electronic apparatus such as a audio device or an air conditioner, which is mounted on a vehicle, comprises a printed circuit board 2, a rotary electrical component 3 which is attached to the printed circuit board 2 and has a rotary variable resistor, a rotary switch, encoder, and the like, an operating knob 8 attached to the rotary electrical component 3, and stopper means 10 which prevents the rotation of the operating knob 8.

Further, the rotary electrical component 3 includes a rotatable member 6 having a rotating shaft 4 and a rotor 5, and an optical detection member 7. The rotor 5 is provided with a concave-convex part 5a arranged in a circular shape. The optical detection member 7 detects the concave-convex part 5a.

Further, in the rotary electrical component 3, when the rotating shaft 4 rotates, the optical detection member 7 detects the concave-convex part 5a of the rotor 5 to perform a predetermined adjustment of the rotary electrical component.

Further, the operating knob 8 is attached to the rotating shaft 4 of the rotatable member 6. The adjustment of the rotary electrical component 3 is performed by the rotation of the operating knob 8.

Further, the operating knob 8 attached to the rotating shaft 4 is arranged so as to protrude outwardly from a hole 9a of a panel 9.

Further, the stopper means 10 has an electromagnetic unit 11 including a solenoid attached to the printed circuit board 2, etc. The electromagnetic unit 11 includes a coil part 11a, a stopper part 11b that is an operating part operated by the electromagnetism of the coil part 11a, and a spring part 11c which presses the stopper part 11b.

Further, the stopper part 11b can be engaged with or disengaged from the concave-convex part 5a provided at the rotor 5 of the rotatable member 6.

The operating device of an electronic apparatus according to the present invention is formed by such a construction. Next, the operation of the operating device of an electronic apparatus according to the present invention will now be described. When the operating device of the electronic apparatus is mounted on a vehicle, the electronic apparatus is turned on or off by the ON operation (position of ACC and position of an engine driving state) or OFF operation of an engine key (not shown).

First, when the engine key is turned off and the power of the electronic apparatus is turned off, as shown in FIG. 1, the stopper part 11b of the stopper means 10 is engaged with the concave-convex part 5a to prevent the rotation of the operation knob 8. Thus, the operating knob 8 is in its non-rotatable state.

Next, when the power of the electronic apparatus is turned on by the ON operation of the engine key, a current flows through the coil part 11a of the electromagnetic unit 11, although not shown. Thus, electromagnetism is generated at the coil part 11a, and the stopper part 11b is attracted to the coil part 11a against the spring part 11c.

As a result, the stopper part 11b is released from the concave-convex part 5a, and the operating knob is in its rotatable state. When the operating knob 8 rotates, the rotating shaft 4 of the rotary electrical component 3 is rotated. Thus, the adjustment of the electronic apparatus such as a audio device and an air conditioner is performed.

Next, when the operating knob 8 is in its rotatable state, if the power of the electronic apparatus is turned off by the OFF operation of the engine key, as shown FIG. 1, a current does not flow into the coil part 11a and the electromagnetism disappears. Thus, the attractive force of the stopper part 11b is released. As a result, the stopper part 11b is engaged with the concave-convex part 5a by the spring part 11c, such that the operating knob 8 is prevented from rotating to be in its non-rotational state.

Specifically, the state of operating knob 8 is automatically changed into a rotatable state and non-rotatable state by the stopper means 10.

Further, in the above-described embodiment, the stopper means 10 is arranged correspondingly to the rotatable member 6 of the rotary electrical component 3. However, the stopper means 10 may be arranged correspondingly to the operating knob 8.

Further, a plurality of operating knobs and a plurality of stopper means may be provided, and the stopper means may be arranged correspondingly to each operating knob.

Further, FIG. 3 illustrates an operating device of an electronic apparatus according to a second embodiment of the present invention. In the second embodiment, a switch unit 12 for turning on or off the power of the electronic apparatus is provided at a panel 9. The other construction of the second embodiment except for the switch unit is the same as that of the first embodiment described above. Thus, the same elements are denoted by the same reference numerals, and the description thereof will be omitted.

When the operating device of an electronic apparatus according to the second embodiment is mounted on a vehicle, the power of the electronic apparatus is turned on or off by the ON operation (position of ACC and position of engine key driving state) or OFF operation of the engine key (not shown). Further, the power of the electronic apparatus can be turned on or off by the operation of the switch unit 12. In this case, when the power of the electronic apparatus is turned on by the ON operation of the engine key, the switch unit 12 may be in an ON state. Further, when the power of the electronic apparatus is in the ON state by the switch unit 12, the power of the electronic apparatus can be turned off by the OFF operation of the engine key.

Specifically, the power of electronic apparatus can be turned on or off on the basis of the operation of the engine key.

Next, the operation according to the second embodiment will now be described. In a state illustrated in FIG. 3, when the engine key is operated to be in an ON state, the power of the electronic apparatus is not turned on in case the switch unit 12 is turned off. Therefore, the state shown in FIG. 3 in which the operating knob 8 is in its non-rotatable state is maintained.

Then, when the switch unit 12 is operated and the power of the electronic apparatus is in an ON state, although not shown, current flows into the coil part 11a of the electronic apparatus. Thus, electromagnetism is generated at the coil part 11a, and the stopper part 11b serving as an operating part is attracted to the coil part 11a against the spring part 11c.

As a result, the stopper part 11b is released from the concave-convex part 5a. Thus, the operating knob 8 is in its rotatable state. In this state, when the operating knob 8 rotates, the rotating shaft 4 of the rotary electric component 3 rotates. Thus, the adjustment of the electronic apparatus such as a audio device and an air conditioner is performed.

Further, in a state in which the operating knob 8 can rotate, when the switch part 12 is in an ON state, the power of the electronic apparatus is turned off by the OFF operation of the engine key, such that a current does not flow into the coil part 11a, and the electromagnetism disappears. Thus, the attractive force of the stopper part 11b is released. As a result, the stopper part 11b engages with the concave-convex part 5a by the spring part 11c, such that the operating knob 8 is prevented from rotating to be in its non-rotatable state.

Specifically, the state of operating knob 8 is automatically changed into a rotatable state or a non-rotatable state by the stopper means 10.

Next, when the operating knob 8 is in its rotatable state, if the power of the electronic apparatus is turned off by the operation of the switch unit 12, as shown FIG. 3, a current does not flow into the coil part 11a, such that the electromagnetism disappears. Thus, the attractive force of the stopper part 11b is released. As a result, the stopper part 11b is engaged with the concave-convex part 5a by the spring part 11c, such that the operating knob 8 is prevented from rotating to be in its non-rotational state.

Further, when the engine key is turned on, every time the switch unit 12 is re-operated, the rotatable state and non-rotatable state of the operating knob 8 are repeated.

Further, the switch unit 12 according to the second embodiment maintains the ON and OFF. However, a switch unit in which, when the power of the electronic apparatus is turned off by the operation of the engine key, the switch unit is turned off, and after an ON operation of the engine key, if the switch is not operated again, the power of the electronic apparatus is not turned on, may be used.

Further, in the second embodiment described above, the stopper means are provided correspondingly to the rotatable member 6 of the rotary electrical component 3. However, the stopper means 10 may be provided correspondingly to the operating knob 8.

Further, a plurality of operating knobs and a plurality of stopper means may be provided, and the stopper means may be provided correspondingly to the respective operating knobs.

The invention claimed is:

1. An operating device of an electronic apparatus comprising:
   a rotatable operating knob protruding from a panel; and
   stopper means for preventing rotational operation of the operating knob,
   wherein, when the power of the electronic apparatus is turned off, the rotational operation of the operating knob is prevented by a stopper part of the stopper means,
   when the power of the electronic apparatus is turned on, the rotational operation of the operating knob can be performed by releasing the stopper part of the stopper means, and
   the power of the electronic apparatus is at least turned off by operation of an engine key of a vehicle.

2. The operating device of an electronic apparatus according to claim 1, wherein the power of the electronic apparatus is turned on by the operation of the engine key of the vehicle, such that the rotational operation of the operating knob can be performed.

3. The operating device of an electronic apparatus according to claim 1, the device further comprising:
   a switch unit which is manually operable for turning on or off the power of the electronic apparatus,
   wherein, when the power of the electronic apparatus is turned on by an operation of the switch unit, the operating knob can rotate by releasing the stopper part of the stopper means, and
   when the power of the electronic apparatus is turned off by the operation of the switch unit, the rotational operation of the operating knob is prevented by the stopper part of the stopper means.

4. The operating device of an electronic apparatus according to claim 3,
   wherein, when the power of the electronic apparatus can be turned on by the operation of the engine key or by the operation of the switch unit, turning on/off of the power of the electronic apparatus can be performed by the switch unit, and
   when the power of the electronic apparatus is turned off from ON state by the operation of the engine key, the rotational operation of the operating knob is prevented by the stopper part of the stopper means.

5. The operating device of an electronic apparatus according to claim 1, wherein the stopper means has a solenoid.

6. The operating device of an electronic apparatus according to claim 1,
   wherein the operating device has a plurality of the operating knobs and a plurality of the stopper means; and
   the stopper means are arranged correspondingly to the respective operating knobs.

7. The operating device of an electronic apparatus according to claim 5, wherein the operating knob is attached to a rotatable member of a rotary electrical component, and the stopper means are arranged correspondingly to the operating knob or the rotatable member.

8. An operating device of an electronic apparatus comprising:
   a rotatable operating knob protruding from a panel; and
   a stopper having a stopper part operative to prevent rotational operation of the operating knob when the power of the electronic apparatus is turned off and operative to permit rotational operation of the operating knob when the power of the electronic apparatus is turned on by release of the stopper part,
   wherein an engine key of a vehicle is operative to at least turn off the power of the electronic apparatus.

9. The operating device of an electronic apparatus according to claim 8, wherein the engine key is operative to turn on the power of the electronic apparatus such that the rotational operation of the operating knob is performable.

10. The operating device of an electronic apparatus according to claim 8, further comprising a manually operable switch unit which is operable to turn on or off the power of the electronic apparatus such that when the power of the electronic apparatus is turned on by an operation of the switch unit, the operating knob is rotatable by releasing the stopper part of the stopper, and when the power of the electronic apparatus is turned off by the operation of the switch unit, the rotational operation of the operating knob is prevented by the stopper part of the stopper.

11. The operating device of an electronic apparatus according to claim 8, wherein the stopper further comprises a solenoid.

12. The operating device of an electronic apparatus according to claim 8,
   wherein the operating device has a plurality of the operating knobs and a plurality of the stoppers; and
   the stoppers are arranged correspondingly to the respective operating knobs.

13. The operating device of an electronic apparatus according to claim 12, wherein the operating knobs are each attached to a rotatable member of a rotary electrical component, and each stopper is arranged correspondingly to the operating knob or the rotatable member.

* * * * *